United States Patent [19]
Marcel

[11] Patent Number: 5,250,197
[45] Date of Patent: * Oct. 5, 1993

[54] POLLUTION PAD RECONDITIONING/RECYCLING SYSTEM

[76] Inventor: Ray C. Marcel, 208 Sandra St., Berwick, La. 70342

[*] Notice: The portion of the term of this patent subsequent to Mar. 9, 2010 has been disclaimed.

[21] Appl. No.: 926,677

[22] Filed: Aug. 7, 1992

Related U.S. Application Data

[63] Continuation of Ser. No. 749,892, Aug. 26, 1991, Pat. No. 5,192,455.

[51] Int. Cl.$^5$ .............................................. B01D 21/26
[52] U.S. Cl. .................................... 210/787; 210/791; 210/805; 134/10; 134/33; 134/40
[58] Field of Search ............... 210/787, 791, 805, 144, 210/195.1; 134/10, 33, 40

[56] References Cited

U.S. PATENT DOCUMENTS

| | | | |
|---|---|---|---|
| 3,645,791 | 2/1972 | Sadwith | 134/33 |
| 4,263,053 | 4/1981 | McKinnon, Jr. | 134/33 |
| 4,521,255 | 6/1985 | Raymer et al. | 134/33 |
| 4,828,769 | 5/1984 | Houser et al. | 210/195.1 |

Primary Examiner—Robert A. Dawson
Assistant Examiner—David Reifsnyder
Attorney, Agent, or Firm—C. Emmett Pugh

[57] ABSTRACT

A pollution pad cleaning system for recyclably removing hydrocarbons from an absorbent material such that the material is re-useable as originally designed. As the preferred embodiment a pollution pad cleaning system comprises a multi-stage treatment process wherein polypropylene absorbent pads soaked with waste oil and the like are treated via a system of squeeze rollers, a solvent shower, centrifuge spin, and then drying and fluffing, restoring the pads to a "like new," reusable condition. The collected waste oil and solvent are removed at a predesignated concentration from the system for recycling. While the preferred embodiment utilizes a continuous system with conveyors and the like, and wherein the contaminated pads are placed upon the ingress portion of the system and the cleaned, reusable pads are discharged from the exit end of the system, an alternative, working embodiment utilizes a system comprising a plurality of treatment stations which may be economically configured utilizing a minimum of labor and start-up costs. The present invention provides an inexpensive, environmentally sound method of treating and recycling pollution absorbing pads wherein in the past the pads were disposed of in landfills, creating still another pollution problem, and at a disposal cost greater than the cost of implementing the present cleaning and recycling system.

5 Claims, 2 Drawing Sheets

POLLUTION PAD RECONDITIONING/RECYCLING SYSTEM

This application is a continuation of application Ser. No. 07/749,892, filed Aug. 26, 1991, now U.S. Pat. No. 5,192,455.

BACKGROUND OF INVENTION

1. Field of Invention

The present invention relates to systems for cleaning and recycling materials for absorbing hydrocarbons and the like, and in particular to a pollution pad cleaning system for recyclably removing hydrocarbons from an absorbent material such that the material is re-useable as originally designed.

The preferred embodiment of the present invention teaches a pollution pad cleaning system comprising a multi-stage treatment process, wherein polypropylene absorbent pads soaked with waste oil and the like are treated via a system of squeeze rollers, a solvent shower, centrifuge spin, and then drying and fluffing, restoring the pads to a like new, reusable condition. The collected waste oil and solvent are removed at a predesignated concentration from is the system for recycling.

While the preferred embodiment of the present invention teaches a continuous system via the utilization of conveyors and the like, and wherein the contaminated pads are placed upon the ingress portion of the system and cleaned, reusable pads are discharged from the exit end of the system, an alternative, working embodiment of the present invention teaches a system comprising a plurality of treatment stations which may be economically configured utilizing a minimum of labor and start-up costs.

The present invention provides an inexpensive, environmentally sound method of treating and recycling pollution absorbing pads. This is in contrast to the past practice when such pads were disposed of in landfills, creating still another pollution problem, and at a disposal cost greater than the cost of implementing the present cleaning and recycling system of the invention.

2. Prior Art & General Background

While the prior art is replete with various designs for oil absorbent materials and the like, none teach or contemplate a system for recycling the materials in a manner contemplated by their use, while recycling the absorbed liquid.

A list of prior patents which may be of interest is presented below:

| Patent No. | Pantentee(s) | Issue Date |
| --- | --- | --- |
| 4,981,097 | Beyrouty | 01/01/1991 |
| 4,969,774 | Arseneeault et al. | 11/13/1990 |
| 4,965,129 | Bair et al | 10/23/1990 |
| 4,925,343 | Raible et al | 05/15/1990 |
| 4,919,820 | Lafay et al | 04/24/1990 |
| 4,737,394 | Zafiroglu | 03/12/1988 |
| 4,652,372 | Threadgill | 03/24/1987 |
| 4,497,712 | Cowling | 02/05/1985 |
| 4,401,471 | Eckardt et al | 08/30/1983 |
| 4,371,441 | Mathes et al | 02/01/1983 |
| 4,341,637 | Smith | 07/27/1982 |

A review of the prior art reveals that there have been taught in the past various methods of absorbing oil utilizing a variety of materials and systems. However, it will be shown below that none contemplate a system for removing the absorbed hydrocarbons in such a manner as to allow them to be recycled, while allowing the absorbent material to be reutilized in the manner which it was originally intended.

For example, U.S. Pat. No. 4,969,774 issued 1990 teaches the utilization of "precooked and puffed cereals as oil spill sorbents", but does not teach or suggest a system wherein the absorbent materials can be recycled. Interestingly, the disclosure recognizes that absorbent pads can pose environmental hazards once used.

U.S. Pat. No. 4,925,343 issued 1990 teaches a composition containing wood fiber for absorbing oil, but teaches as the only disposal remedy for the hydrocarbon-soaked composition burial or burning.

U.S. Pat. No. 4,919,820 issued 1990 teaches the utilization of mesh containers containing waterfowl feathers for absorbing oil and the like, recognizing that "Reclamation of the oil may be effected by squeezing the container and feathers therein to separate the oil from the feathers, and collecting the separated oil . . . " it is submitted, however, that once the waterfowl feathers become saturated with oil, their absorption capability will be greatly decreased, and squeezing the oil will not sufficiently remove the contaminants to allow for performance near approaching the first usage.

U.S. Pat. No. 4,737,394 issued 1988 teaches an oil-absorbing article comprising a porous outer fabric of polyethylene or polypropylene which encloses fibrous oil absorbing particles. While the specification does not teach the recycling of the article, there is disclosed the hand wringing of the absorbed liquid from the article, and an indication that "the samples readily absorbed about an equal quantity of oil as was wrung out, even after the procedure was repeated several times . . . " (Col 7 Lines 3-6.)

U.S. Pat. No. 4,652,372 issued 1987 teaches an endless-belt type skimmer comprising an oleophilic belt and squeeze system for removing the hydrocarbons, and there are a number of these types of skimmers known in the art.

U.S. Pat. No. 4,497,712 issued 1985 teaches an absorbent pillow utilizing corn cob material for absorbing hydrocarbons, wherein the used pillow "may be utilized by a utility company or other type of company as fuel in a furnace . . . Alternatively, the pillow bay be used as land fill . . . "

U.S. Pat. No. 4,341,637 issued 1982 teaches an endless belt type skimmer wherein the oil is removed via pressurized steam applied to the belt.

As may be discerned from a review of the above, the prior art has failed to teach or contemplate a system for the economical and environmentally sound recycling of absorbent materials for absorbing liquid hydrocarbons and the like, and has at best suggested less destructive ways of disposing the used materials.

The '820 reference was the only patent to suggest any procedure for providing limited re-use of the absorbent, with that procedure limited only to the wringing out of the liquid. However, it is submitted that any re-use would appear to be limited, and without the results achieved in its first use. The '394 reference also discussed some hand wringing of the composition it claimed, but again it is submitted that wringing of the composition it claimed, but again it is submitted that wringing is insufficient to provide a re-useable system, as residue remains which is dirty, collects other contaminants, and may pose health and further environmental hazards during use. Further, it is averred that the absorption characteristics must and will be less with an unclean absorption material, effecting its performance.

GENERAL SUMMARY DISCUSSION OF THE INVENTION

The present invention, effective system for relatively inexpensive, safe and highly sorption pads and removing liquid hydrocarbons and the like from absorption pads and other compositions, allowing their repeated re-use, as well as reclamation and recycling of the absorbed liquid.

The preferred, exemplary embodiment of the present invention teaches a conveyor-type arrangement wherein the used absorption pads are drained, squeeze rolled, exposed to a solvent shower, rerolled, spun in a centrifuge, air dried, fluffed and repackaged.

This conveyor driven system allows for the processing of the pads such that they are cleaned and ready for re-use with nominal labor and at a lesser time rate than the alternative system discussed below.

The alternative embodiment of the present invention teaches a system wherein each step is performed in separate stations, with the work pieces moved by hand f rom one step to the next. While this system may be slightly more expensive to operate, it offers the advantage of lesser start-up costs.

The system teaches the utilization of a recirculating solvent shower for cleaning the pads of residual oil and the like and removing the oil for eventual recycling.

The present system not only provides a cost savings relative to the purchase of new pads, but is in fact substantially less costly than the disposal of the used pads, which disposal, which nay include incineration or disposal in a hazardous waste facility, can easily run over, for example, two hundred ($200.00) dollars per fifty-five (55) gallon drum of pads.

It is another object of the present invention to provide an effective, safe, yet inexpensive system for recycling and reconditioning hydrocarbon liquid absorption pads, wherein the absorbed hydrocarbon liquid is collected and is suitable for recycling.

It is another object of the present invention to provide a system for recycling pollution pads and the like wherein the pads are restored to a clean, residue free condition suitable for re-use as originally designed and contemplated, with similar effectiveness.

It is still another object of the present invention to provide a system for the reconditioning and recycling of the pollution pads and the like, wherein there is provided a recirculating solvent shower for removing residue from the used pads.

Lastly, it is an object of the present invention to provide a system for the reconditioning and recycling of pollution pads and the like which may be utilized with a variety of, hydrocarbon liquids and diverse other fluids.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED, EXEMPLARY EMBODIMENTS

Figure 1:
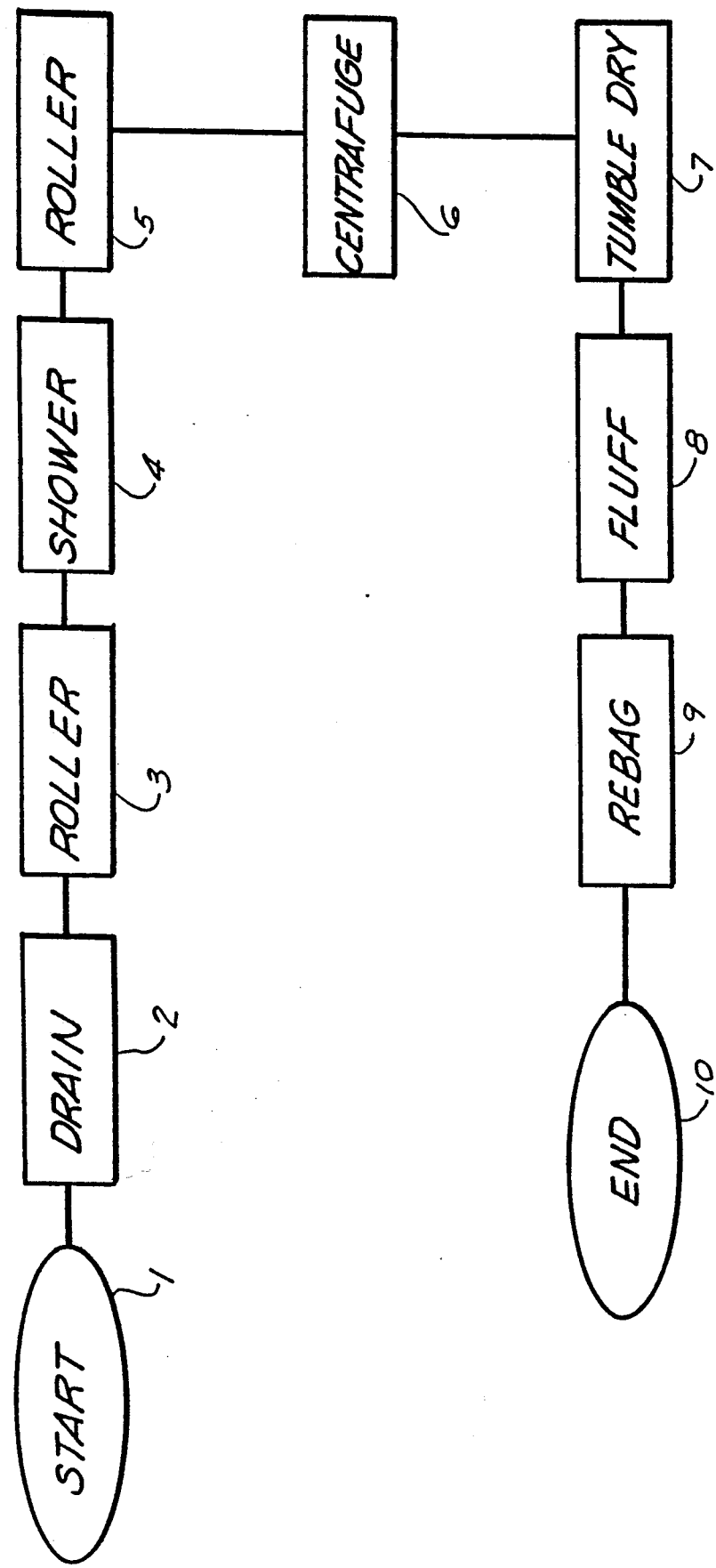
FIG. 1 is a view of a f low chart setting forth the pollution pad reconditioning/recycling system of the preferred embodiment of the of the present invention.
Figure 2:
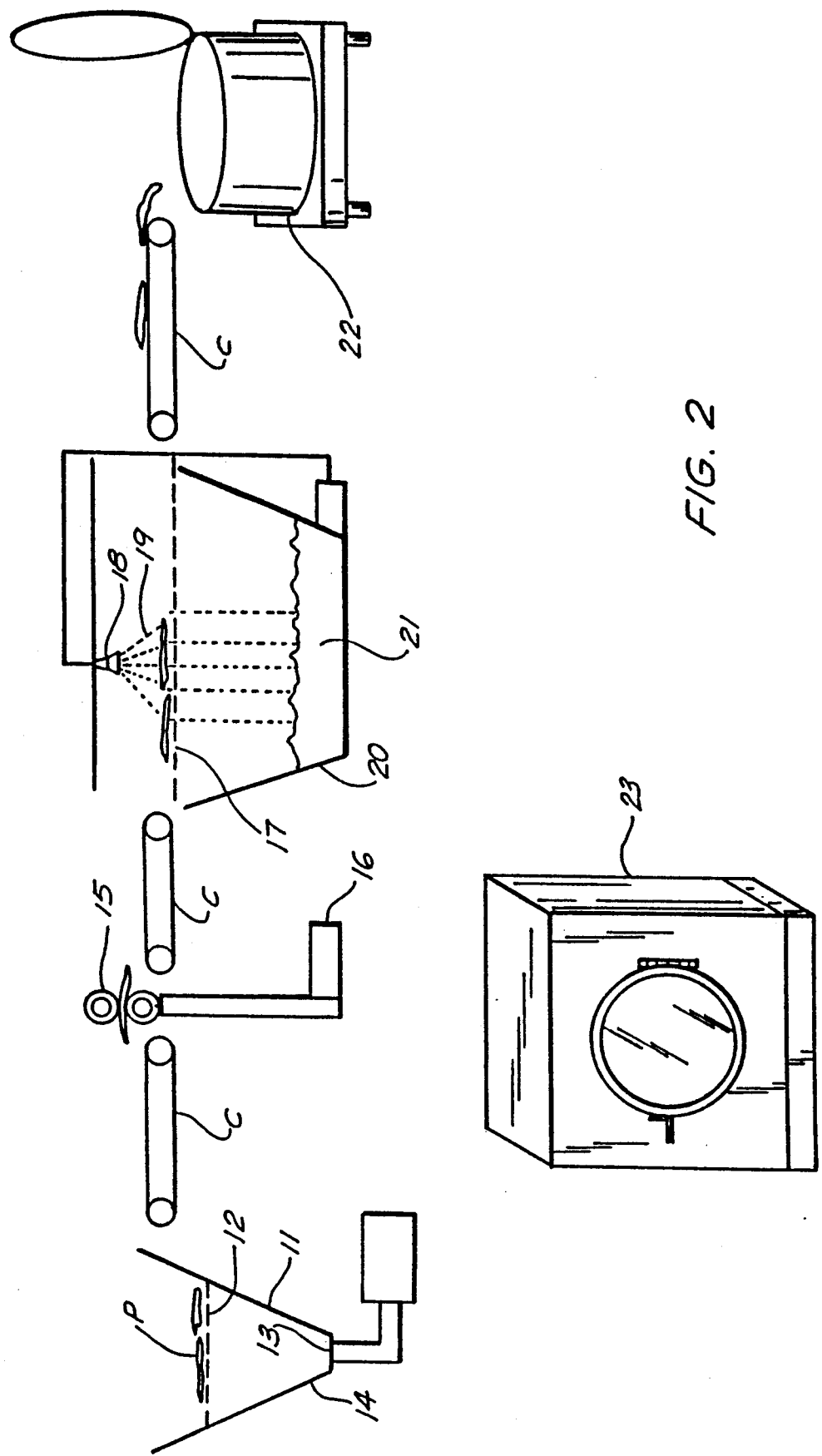
FIG. 2 is a generalized, simplified view of a first, exemplary, preferred embodiment of the present invention utilizing the steps and stages of the f low chart of FIG. 1 in an integrated, more automated system.

As can be seen in FIGS. 1 and 2, the pollution pad recycling process of the preferred, exemplary embodiment of the present invention, includes a multiple-step system, wherein there is provided means for cleaning contaminated pollution pads, which typically are contaminated with liquid hydrocarbons such as oil (crude or refined) and derivatives thereof.

In the present process, multiple individual pads P, typically measuring seventeen inches by nineteen inches (17"×19"), are placed by the user in, for example, a fifty-five (55) gallon drum and forwarded to the exemplary facility of the present invention. This is in contrast to the prior art wherein the pads were disposed of at substantial loss, both economically and environmentally, in a waste facility.

The drums are received (step 1), the contaminated pads are removed and shaken to remove any soil or solid contaminants therefrom, and then placed in a drain container 11 having an approximate capacity of, for example, two hundred (200) gallons, with screens 12 and a drain 13 at the base 14 for allowing the draining of any excess fluid contaminants from the pollution pads.

In the preferred embodiment of the present invention, typically the system is processed utilizing, for example, seventy (70) pound batch loads for each step. However, this figure can vary widely depending upon the volume, contamination of the product, and state and capacity of the various components of the present system.

After draining, typically for, for example, about ten to twenty (10-20) minutes, each pad is individually passed through a power roller 3, 15 for the further squeezing out of the liquid contaminants. The exemplary embodiment of the present invention utilizes a conventional heavy duty, powered roller operating at a speed of, for example, approximately sixty (60) revolutions per minute, with preferably foot control means 16 for initiating power on or off.

After having passed through the roller, the batch is ready for cleaning and is then placed in a single layer upon a drain screen 17 under at least one shower head 18 configured to provide a recirculating solvent shower 4, 19 for further removing the is hydrocarbon contaminants and other residues on the pads. The exemplary, preferred solvent utilized in the present system is varsol, which is found to work well with most pollution pads, which typically are fabricated from polypropylene.

It is noted that it has been found that the shower preferably should not incorporate degreasers or detergents, as their presence would cause the polypropylene pads to absorb water in any future use of the cleaned pad. The ability to absorb water is an undesirable characteristic for a pollution pad, which is designed to absorb hydrocarbon and related contaminants but allow water to remain unabsorbed.

In operation, the shower disperses the solvent evenly over the pads, which drains therethrough, dissolving the hydrocarbons and contaminants from the pads , allowing them to drain out of the pads, through the drain screen 19, and into the drain tank 20. There the varsol can be recirculated for showering more pads until the hydrocarbon/contaminant concentration 21 therein has arise to too high amount to allow the overly contaminated varsol to serve as an effective cleaner, which has been found to be on the order of, for example, thirty (30%) percent hydrocarbon/contaminant.

The varsol shower's drain screen has dimensions of, for example, four feet by eight feet (4'×8') feet, with multiply dispersed, gentle spray nozzles configured for uniform soaking of the pads. The present exemplary embodiment has, for example, fifteen (15) spray nozzles in the form of, for example, converted natural gas burners. Further, the present system utilizes, for example, a five hundred (500) gallon solvent tank, with a three (3) horsepower electric impeller type pump for circulating the solvent.

While the time in the shower varies depending upon the degree and type of contamination, the material of the pads, and the type of solvent, the exemplary embodiment of the present invention typically utilizes the shower step for, for example, ten to fifteen (10-15) minutes before the pads have been sufficiently cleansed to allow for the progression to the next step, which achieves on the order of ninety-seven to ninety-nine (97-99%) percent hydrocarbon and contamination removal.

It is noted that once the solvent has been contaminated so as to make it unusable any longer in the present process, it may be sold to an oil recycler for re-refining into useable hydrocarbon products.

After the pads have been allowed to drain on the drain screen of the shower (note 4) after the varsol spray has ceased, each pad is then once again placed through a roller 5, 15 of the type utilized in step 3 above. It is estimated that this step removes, for example, approximately eighty-five (85%) of the residual varsol or other solvent from the pollution pad.

Once the pads have been squeezed, the batch is then placed in a large centrifuge extractor 22 (note 6), wherein the batch is rotated at a rate of I f or example, seven hundred and fifty to a thousand (750-1000) revolutions per minute. Again, while the time varies depending upon the type and weave of material in the pads and the degree of residual solvent, the exemplary embodiment of the present invention typically spins the batch load for, for example, ten (10) minutes in the centrifuge, typically removing another, for example, twelve to thirteen (12-13%) percent of the residual varsol or other solvent.

After the batch load has been extracted in the centrifuge 6, the load is then placed in a commercial type air tumbler/dryer 7, 23 for approximately twenty to thirty or more (20-30+) minutes for removal of the remaining, for example, three to four (3-4%) percent varsol or other solvent. Depending upon the humidity, temperature, material of the pad and the type of solvent, the air dryer may have heated air at various appropriate temperatures, or it may be at room temperature.

Following the drying process, the batch load of cleaned pads is then placed upon a table or the like and fluffed 8, either by hand or machine, in order to provide a pollution pad of similar appearance, consistency, and performance as it may have had prior to its utilization.

Once fluffed, the pads are then ready for bagging, rebagging 9 or like packaging, which may include placement of multiples of the pads in plastic bags or the like and re-placement into the drum(s) the pads arrived in, after the drum itself has been cleaned of contaminants.

Once packaged, the batch load is ready for delivery and reuse, ending the recycling process 10, until the load is contaminated again and ready for re-processing.

It is estimated that a batch load comprised of general purpose "disposable" polypropylene pads will, with the present system, can be processed at least, for example, about five to seven (5-7) times, thereby avoiding the disposal and replacement costs of, for example, $1,372.00 dollars per pad with one batch.

It is noted that, while the exemplary embodiment of the present invention of FIG. 2 illustrates a system wherein the steps can be practiced sequentially with hand labor interceding to move the batches from one step or stage to another, the present system is preferably implemented in conjunction with a conveyor system C to allow for a continuous process, substantially increasing the volume processing capability of the present system and decreasing processing costs due to labor.

Further, the present system is not limited solely to pollution pads which have hydrocarbon contamination therein, but may be utilized with regard to any contaminant, as long as there can be provided a solvent for removing that contaminant in the shower step 4.

The embodiments described herein in detail for exemplary purposes are of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

What is claimed is:

1. A method of removing liquid hydrocarbons from pollution pads, restoring the pollution pads to a reusable state, comprising the following steps:

A. providing an apparatus for the removal of liquid hydrocarbons from pollution pads comprising
   drain means for draining excess liquids from the pollution pads;
   squeeze means associated with said drain means for squeezing out additional liquid from pollution pads;
   a recirculating liquid cleaning area having an upper portion and a medial portion for diluting and removing the liquid hydrocarbons from the pollution pads, said recirculating liquid cleaning area further including
      at least one liquid cleaning area forming the upper portion of said recirculating liquid cleaning area, said liquid cleaning area being configured for evenly dispersing a fluid solvent over the liquid cleaning area;
   fluid permeable means for positioning pollution pads within the liquid cleaning area, said fluid permeable means forming the medial area of said recirculating liquid cleaning area;
   basin means for receiving a quantity of cleaning fluid, comprising the solvent and a percentage of the liquid hydrocarbon permeating said fluid permeable means, said basin means further including storage means for storing said fluid; and
   circulation means for circulating the cleaning fluid from said basin means to said liquid cleaning area, said circulation means further comprising a fluid pump and fluid conveying means directed from said basin to said liquid cleaning area;
said apparatus further comprising a centrifuge extractor for extracting fluid absorbed by the pollution pads after having been treated by said cleaning fluid; and a tumble dryer for drying residual solvent absorbed by the pollution pads;

B. draining said pollution pads in said drain means for a period of time so as to allow draining of any excess fluids from the pollution pads;

C. squeezing the pollution pads through said squeeze means so as to remove additional fluid from the pollution pads;

D. positioning the pollution pads in association with said fluid permeable means;

E. cleaning the pollution pads with a solvent, thereby diluting and substantially removing any remaining absorbed liquid hydrocarbons;

F. draining the solvent from the cleaned pollution pads;

G. squeezing the pollution pads again through said squeeze means;

H. extracting the remaining absorbed solvent from the pollution pads by placing them in a centrifuge and spinning them in a centrifuge and spinning them; and I. tumbling the pollution pads in a tumble dryer until any remaining solvent in the pollution pads has drained or evaporated.

2. The method of claim 1, wherein after step "I" there is further included the step of fluffing the pollution pads.

3. The method of claim 1, wherein after step "I" there is further included the step of bagging the pollution pads.

4. The method of claim 1, wherein said cleaning area includes a shower connected to said fluid cleaning means from said basin, and in step "E" there is further included the step of bathing the pads by showering the cleaning fluid solvent unto the pollution pads, evenly dispersing the cleaning fluid unto the pads.

5. The method of claim 1, wherein in step "H" there is further included the step of spinning the pads at a rate of about seven hundred to a thousand (700-1000) revolutions per minute.

* * * * *